United States Patent
Chen

(10) Patent No.: US 8,432,683 B2
(45) Date of Patent: Apr. 30, 2013

(54) COMPUTER ENCLOSURE

(75) Inventor: Xiao-Zhu Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 268 days.

(21) Appl. No.: 12/975,291

(22) Filed: Dec. 21, 2010

(65) Prior Publication Data
US 2012/0147557 A1 Jun. 14, 2012

(30) Foreign Application Priority Data
Dec. 14, 2010 (CN) .......................... 2010 1 0587466

(51) Int. Cl.
*G06F 1/16* (2006.01)
*H05K 5/00* (2006.01)
*H05K 7/00* (2006.01)

(52) U.S. Cl.
USPC ............ 361/679.39; 361/679.33; 361/679.37

(58) Field of Classification Search . 361/679.33–679.45
See application file for complete search history.

(56) References Cited

U.S. PATENT DOCUMENTS

| | | | |
|---|---|---|---|
| 6,025,989 A * | 2/2000 | Ayd et al. ...................... 361/695 |
| 6,137,684 A * | 10/2000 | Ayd et al. ...................... 361/727 |
| 6,616,106 B1 * | 9/2003 | Dean et al. .................... 248/27.1 |
| 6,865,091 B2 * | 3/2005 | Hsu ............................... 361/801 |
| 6,891,728 B1 * | 5/2005 | Mease et al. ................... 361/724 |
| 7,090,528 B2 * | 8/2006 | Tuttle et al. ................... 439/383 |
| 2003/0155471 A1 * | 8/2003 | Dean et al. .................... 248/27.1 |
| 2004/0021047 A1 * | 2/2004 | Dean et al. .................... 248/300 |
| 2004/0125575 A1 * | 7/2004 | Chen et al. ..................... 361/759 |
| 2005/0051672 A1 * | 3/2005 | Dean et al. .................... 248/27.1 |
| 2005/0128723 A1 * | 6/2005 | Chen et al. ..................... 361/801 |
| 2005/0146846 A1 * | 7/2005 | Chen et al. ..................... 361/683 |
| 2005/0180121 A1 * | 8/2005 | Chen et al. ..................... 361/752 |
| 2005/0190544 A1 * | 9/2005 | Chen et al. ..................... 361/801 |
| 2007/0053155 A1 * | 3/2007 | Lai et al. ........................ 361/687 |
| 2009/0073651 A1 * | 3/2009 | Hu et al. .................... 361/679.58 |

\* cited by examiner

*Primary Examiner* — Adrian S Wilson
(74) *Attorney, Agent, or Firm* — Altis Law Group, Inc.

(57) ABSTRACT

A computer enclosure includes an enclosure, a mounting board, a device mounted to the mounting board, and a latching member pivotably mounted to the mounting board. The enclosure includes a bottom plate, and a number of mounting tabs extend from the bottom plate. The mounting board is detachably mounted to the bottom plate. A number of clamping hooks extend from the mounting board, to fix the mounting tabs. The latching member includes an elastic hook. The latching member is rotated, with the elastic hook received in or withdrawing from the enclosure. When the hook engages with the enclosure, the latching member prevents the clamping hooks from disengaging from the mounting tabs.

10 Claims, 5 Drawing Sheets

COMPUTER ENCLOSURE

BACKGROUND

1. Technical Field

The disclosure relates to computer enclosures, and particularly to a mountable computer enclosure.

2. Description of Related Art

When a computer is assembled, a mounting board is often mounted in a computer enclosure to receive devices, such as data storage devices, often by screws, which is complicated and time-consuming for assembly. Moreover, in this process, one or more screws can easily fall into the crowded interior of the computer enclosure, thus requiring a difficult retrieval.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
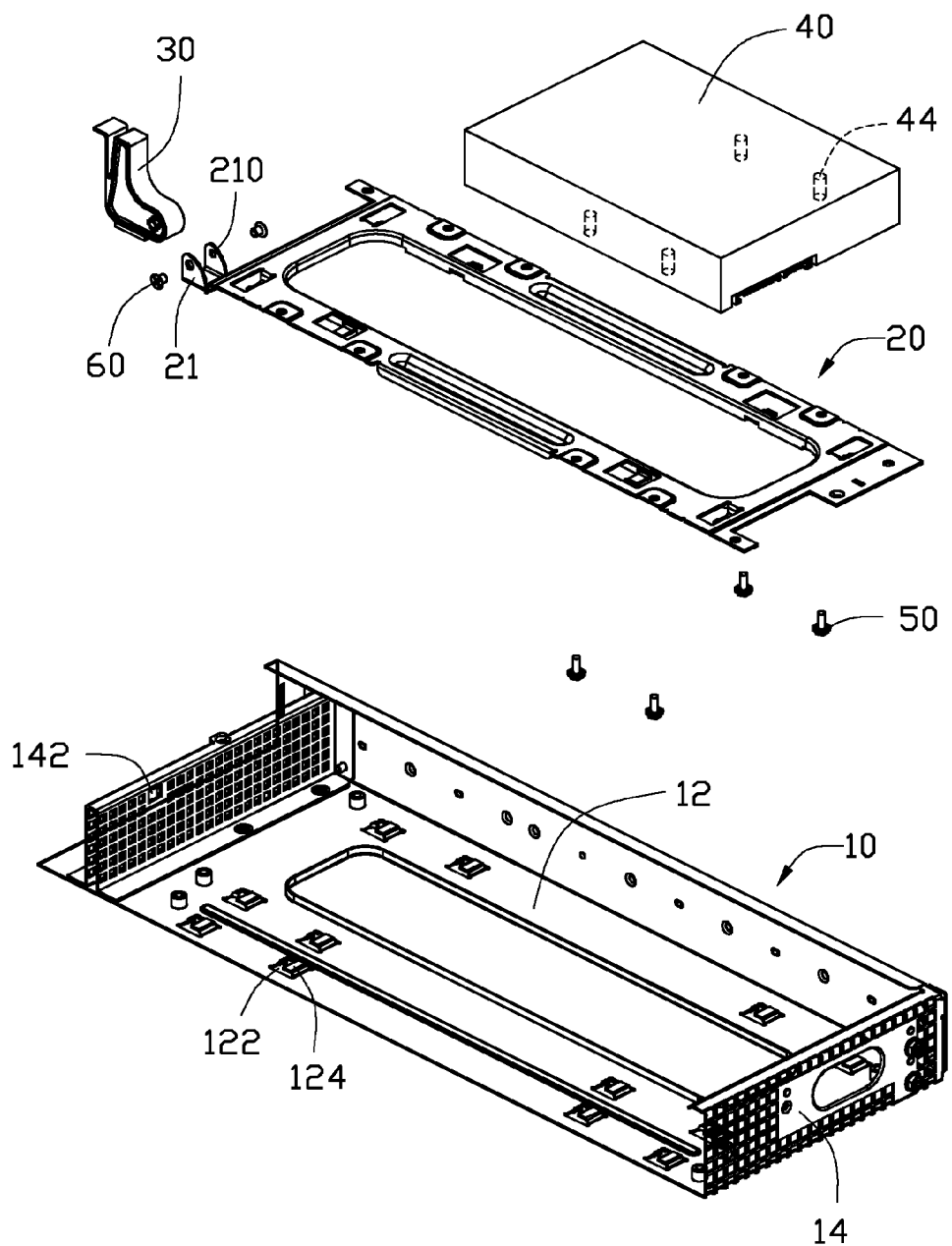
FIG. 1 is an exploded, isometric view of a computer enclosure, the computer enclosure includes a mounting board and a latching member.

Referring to FIG. 1, a computer enclosure includes an enclosure 10, a mounting board 20 mounted in the enclosure 10, a latching member 30 pivotably mounted to the mounting board 20, a device, for example, a data storage device 40 mounted to the mounting board 20, a plurality of fasteners 50, and two pins 60. In this embodiment, the fasteners 50 are screws.

A plurality of fixing holes 44 is defined in a bottom of the data storage device 40.

The enclosure 10 includes a bottom plate 12, and two side plates 14 extending up from opposite ends of the bottom plate 12. The bottom plate 12 defines a plurality of through holes 122. A plurality of mounting tabs 124 extends from the bottom plate 12, each mounting tab 124 is substantially bridge-shaped, and opposite ends of each mounting tab 124 connect to opposite sides bounding the corresponding through hole 122. One of the side plates 14 defines a locking hole 142. In other embodiments, the bottom plate 12 does not define the through holes 122, and opposite ends of each mounting tab 124 are connected to the bottom plate 12.

Figure 2:
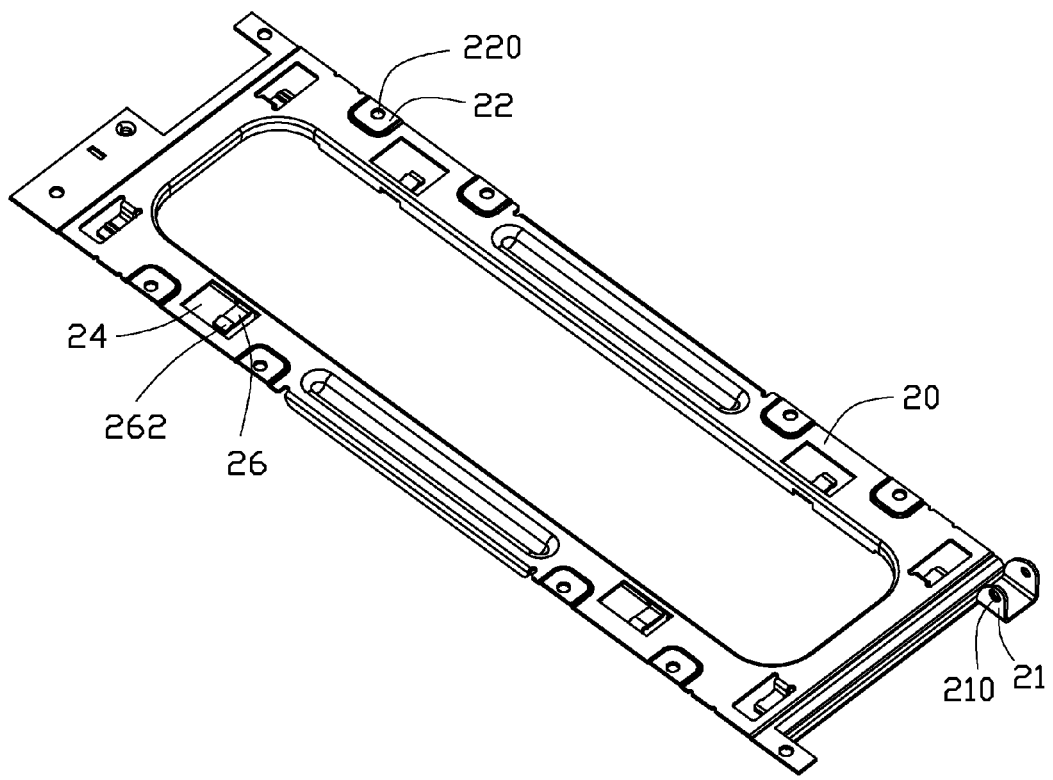
FIG. 2 is an enlarged view of the mounting board of FIG. 1.

Referring to FIG. 2, the mounting board 20 includes two extensions 21 extending from one end of the mounting board 20, each extension 21 defining a mounting hole 210. A plurality of protrusions 22 extend up from opposite sides of a top of the mounting board 20. Each protrusion 22 defines a fixing hole 220. The mounting board 20 defines two through holes 24 in one of the sides of the mounting board 20, each between two adjacent protrusions 22. A substantially L-shaped clamping hook 26 depends from a side bounding each through hole 24, and then extends towards an opposite side bounding the mounting board 20. A resisting block 262 extends from a distal end of the clamping hook 26. In other embodiments, the mounting board 20 does not define the through holes 24, and the clamping hooks 26 extend from the bottom of the mounting board 20.

Figure 3:
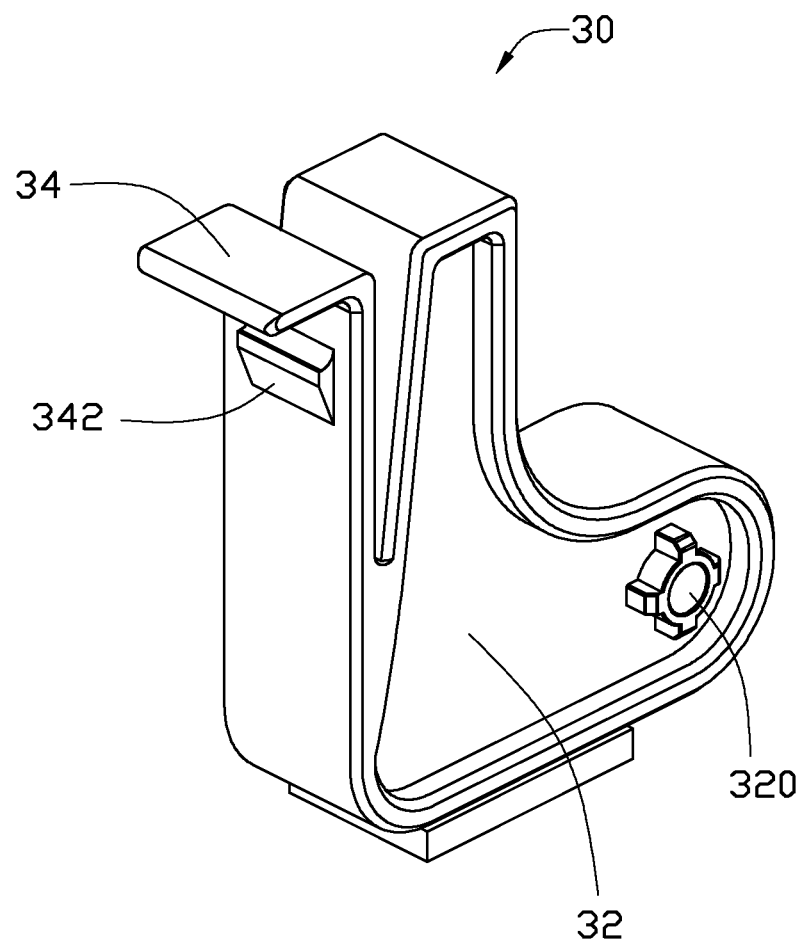
FIG. 3 is an enlarged view of the latching member of FIG. 1 from another perspective.

Referring to FIG. 3, the latching member 30 includes a main body 32, and a substantially L-shaped elastic hook 34 extending from the main body 32. The main body 32 defines a pivot hole 320. A contact extension 342 extends from the elastic hook 34, opposite to the main body 32.

Figure 4:
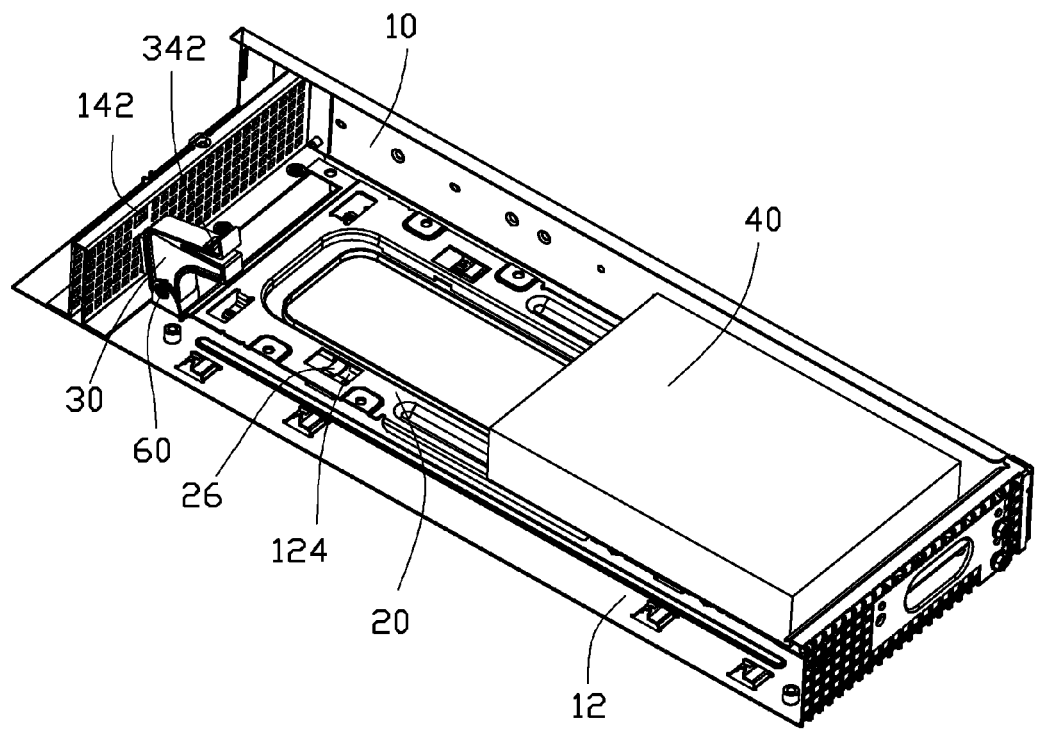
FIG. 4 is an assembled, isometric view of FIG. 1.
Figure 5:
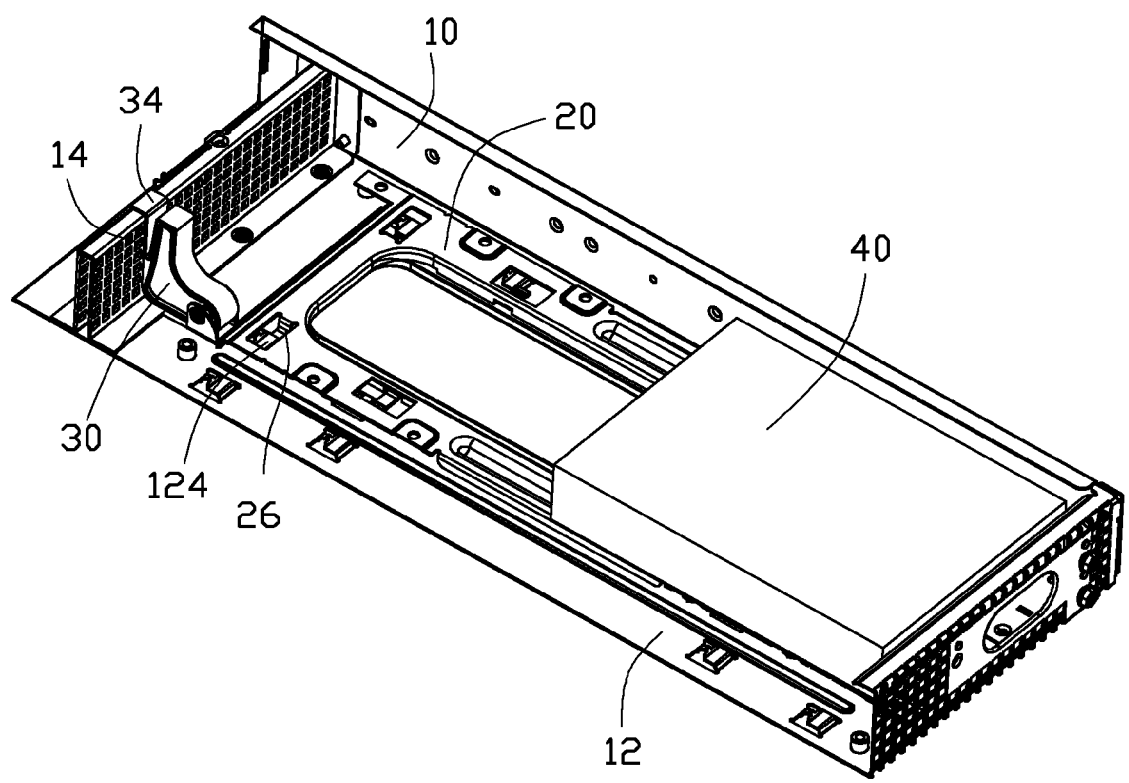
FIG. 5 is a view of FIG. 4 in use.

Referring to FIGS. 4 and 5, in assembly, the fasteners 50 are extended through the fixing holes 220 of the mounting board 20, and then are screwed in the fixing holes 44 of the data storage device 40. Therefore, the data storage device 40 is mounted to the mounting board 20. The clamping hooks 26 of the mounting board 20 are extended under the mounting tabs 124 of the enclosure 10, with the resisting block 262 of each clamping hook 26 resisting against the corresponding mounting tab 124, to maintain the mounting board 20 within the enclosure 10. The pins 60 are pivotably extended through one of the mounting holes 210 of the mounting board 20, the pivot hole 32 of the latching member 30, and the other mounting hole 210 of the mounting board 20. Therefore, the latching member 30 is pivotably mounted to the mounting board 20. The latching member 30 is rotated until the elastic hook 34 of the latching member 30 is latched to a corresponding side plate 14, with the contact extension 342 of the latching member 30 engaged in the locking hole 142 of the side plate 14. Therefore, the mounting board 20 is prevented from being disengaged from the mounting tabs 124 and mounted to the enclosure 10.

In removal of the mounting board 20 from the enclosure 10, the elastic hook 34 of the latching member 30 is rotated away from the side plate 14, with the contact extension 342 of the latching member 30 withdrawn from the locking hole 142 of the side plate 14. At this time, the clamping hooks 26 of the mounting board 20 can be drawn out from the mounting tabs 124 of the enclosure 10, and the mounting board 10 together with the data storage device 40 can be readily removed from the enclosure 10.

It is believed that the present embodiment and its advantages will be understood from the foregoing description, and it will be apparent that various changes may be made thereto without departing from the spirit and scope of the description or sacrificing all of their material advantages, the example hereinbefore described merely being exemplary embodiment.

What is claimed is:

1. A computer enclosure comprising:
   an enclosure comprising a bottom plate and a side plate substantially perpendicular to the bottom plate and defining a locking hole, a plurality of mounting tabs protruding from the bottom plate;
   a mounting board detachably mounted to the bottom plate, comprising a plurality of clamping hooks extending therefrom to engage with the mounting tabs;
   a device mounted to the mounting board; and
   a latching member comprising a main body pivotably mounted to the mounting board, and an L-shaped elastic hook extending from the main body, a contact extension extending from the elastic hook opposite to the main body, wherein the latching member is operable to be rotated, with the contact extension engaging with or withdrawing from the locking hole; when the contact extension engages with the locking hole, the latching member prevents the clamping hooks from disengaging from the mounting tabs.

2. The computer enclosure of claim 1, wherein two opposite extensions extend from one end of the mounting board, and the main body of the latching member is pivotably mounted between the extensions.

3. The computer enclosure of claim 1, wherein each mounting tab is substantially bridge-shaped, opposite ends of each mounting tab are connected to the bottom plate, each clamping hook is substantially L-shaped, and depends from a bottom of the mounting board.

4. The computer enclosure of claim 3, wherein a resisting block extends from a distal end of the clamping hook, to resist against the corresponding mounting tab.

5. The computer enclosure of claim 3, wherein a plurality of protrusions extend up from a top of the mounting board, each protrusion defines a fixing hole, a plurality of fixing holes are defines in a bottom of the device, a plurality of fasteners are extended through the fixing holes of the mounting board, and then are screwed in the fixing holes of the device.

6. The computer enclosure of claim 1, wherein the bottom plate defines a plurality of through holes, opposite ends of each mounting tab are connected to opposite sides bounding the corresponding through hole, each clamping hook is substantially L-shaped, and extends from a bottom of the mounting board.

7. The computer enclosure of claim 6, wherein a resisting block extends from a distal end of the clamping hook, to resist against the mounting tab.

8. The computer enclosure of claim 6, wherein two opposite extensions extends from one end of the mounting board, and the main body of the latching member is pivotably mounted between the extensions.

9. A computer enclosure comprising:
  an enclosure comprising a bottom plate, a plurality of mounting tabs protruding from the bottom plate;
  a mounting board detachably mounted to the bottom plate, comprising a plurality of clamping hooks extending therefrom to engage with the mounting tabs;
  a device mounted to the mounting board; and
  a latching member pivotably mounted to the mounting board, and comprising an elastic hook, wherein the latching member is operable to be rotated, with the hook engaging with or withdrawing from the enclosure; when the hook engages with the enclosure, the latching member prevents the clamping hooks from disengaging from the mounting tabs;
  wherein each mounting tab is substantially bridge-shaped, opposite ends of each mounting tab are connected to the bottom plate, each clamping hook is substantially L-shaped, and depends from a bottom of the mounting board to extend under the corresponding tab; a resisting block extends from a distal end of the clamping hook, to resist against the corresponding mounting tab.

10. The computer enclosure of claim 9, wherein the bottom plate defines a plurality of through holes, opposite ends of each mounting tab are connect to opposite sides bounding the corresponding through hole.

* * * * *